US010610949B2

(12) United States Patent
Chuang et al.

(10) Patent No.: US 10,610,949 B2
(45) Date of Patent: Apr. 7, 2020

(54) WELDING WIRE FEEDING DEVICE

(71) Applicants: KUANG TAI METAL INDUSTRIAL CO., LTD., Tainan (TW); Cheng Hsin Chuang, Tainan (TW)

(72) Inventors: Cheng Hsin Chuang, Tainan (TW); Hua Cheng Chiang, Tainan (TW); Ching Chia Chen, Tainan (TW); I Chin Chou, Tainan (TW); Chien Yang Liu, Tainan (TW)

(73) Assignees: Kuang Tai Metal Industrial Co., Ltd., Tainan (TW); Cheng Hsin Chuang, Tainan (TW)

( * ) Notice: Subject to any disclaimer, the term of this patent is extended or adjusted under 35 U.S.C. 154(b) by 570 days.

(21) Appl. No.: 15/472,649

(22) Filed: Mar. 29, 2017

(65) Prior Publication Data

US 2017/0291243 A1    Oct. 12, 2017

(30) Foreign Application Priority Data

Apr. 8, 2016    (TW) .............................. 105204870 U (51) Int. Cl.
| | | |
|---|---|---|
| *B23K 9/12* | (2006.01) | |
| *B23K 9/16* | (2006.01) | |
| *B23K 9/133* | (2006.01) | |

(52) U.S. Cl.
CPC ............ *B23K 9/125* (2013.01); *B23K 9/1336* (2013.01); *B23K 9/16* (2013.01)

(58) Field of Classification Search
CPC ........ B23K 9/122; B23K 9/125; B23K 9/295; B23K 9/1336; B23K 9/133; B23K 9/325; B23K 9/291; B23K 9/16; B32K 9/1333; B65H 51/10; B65H 2701/36
USPC ............... 219/137 PS, 137.2, 137.31, 137.63
See application file for complete search history.

(56) References Cited

U.S. PATENT DOCUMENTS

| | | | | |
|---|---|---|---|---|
| 6,225,599 | B1 * | 5/2001 | Altekruse | .............. B23K 9/124 219/137.31 |
| 2006/0278623 | A1 * | 12/2006 | Christopher | ......... B23K 9/1336 219/137.7 |

FOREIGN PATENT DOCUMENTS

CA          2435837 A1 *  1/2004  ............. B23K 9/295

* cited by examiner

*Primary Examiner* — Ibrahime A Abraham
*Assistant Examiner* — Biniam B Asmelash
(74) *Attorney, Agent, or Firm* — Rosenberg, Klein & Lee (57) ABSTRACT

A welding wire feeding device includes a base, a fixing post, a pressing member, a motor, and a conveying mechanism. The pressing member is pivotally connected with a driven wheel. A tension spring is provided between the fixing post and the pressing member. A shaft portion of the motor is pivotally connected with a driving wheel. The conveying mechanism is coupled to the base and has an air hole. The base is formed with a first passage and a second passage connected with a gas cylinder. The length of the conveying tube of the conveying mechanism can be adjusted by pressing. A wire is sandwiched between the driving wheel and the driven wheel through the tension spring. The motor drives the driving wheel to rotate the driven wheel so as to continuously convey the wire; meanwhile, the inert gas can be sent out through the second passage and the conveying mechanism to prevent a workpiece from being oxidized.

9 Claims, 8 Drawing Sheets

WELDING WIRE FEEDING DEVICE

FIELD OF THE INVENTION

The present invention relates to a metal wire feeding device, and more particularly to a feeding device which is able to convey a protective gas while a wire is conveyed and able to adjust the length of a conveying tube.

BACKGROUND OF THE INVENTION

A wire feeding device is used to convey a fine wire for a welding machine or a machine used to repair precision objects. In recent years, with the advent and the rapid development of 3D printing machines, not only 3D printing technology is gradually popular but also the related materials or wire feeding devices for 3D printing have become the focus of the research and development or improvement of the relevant industry. The existing wire feeding device is bulky, so it is difficult to be combined with a working machine. In addition, if the stability or accuracy of conveying a wire is not good, it will also have a great impact on welding products and defects.

In order to improve the above-mentioned shortcomings, TW Patent Publication No. 1429575 discloses a "wire feeding roller mechanism". The wire feeding roller mechanism comprises a wire roller assembly and a drive device above and below a machine base, respectively. A cylinder slide is provided in front of the wire roller assembly. A vacuum wire feeding device is disposed on the cylinder slide. Thereby, the drive device of a toothed pulley assembly drives the roller assembly to convey a wire and the cylinder slide is moved synchronously. When the wire is conveyed smoothly and the cylinder slide is moved back, the roller assembly clamps the wire. By means of vacuum suction, the wire is kept straight and conveyed stably, achieving an accurate and stable effect for conveying the wire.

TW Patent Publication No. M415014 discloses a "portable wire feeding mechanism". The portable wire feeding mechanism comprises a power unit, a driving roller, a wire feeding roller, a pressing roller, and a pressing lever handle. The pressing lever handle is connected with the pressing roller through a pressing lever and an arm. Two sides of the joint of pressing roller and the wire feeding roller are provided with sleeves as an inlet and an outlet. When the power device drives the driving roller to rotate, the driving roller drives the wire feeding roller so that a welding wire is outputted from a welding wire guide groove disposed above the wire feeding roller and the pressing roller, with a simple structure to achieve the effect of adjusting the speed of conveying the welding wire.

Japanese Patent Publication No. 2003-001421 discloses a "welding wire feeder for a welding machine". The welding wire feeder comprises a first rotation axle, a second rotation axle, and a third rotation axle. The first rotation axle is wound with a wire. The second rotation axle is provided with a drive wheel. The third rotation axle is provided with a driven wheel. The driven wheel is disposed on a lever member. The lever member is disposed on a mounting frame. A bolt is screwed to the lever member for bringing the driving wheel to get contact with the driven wheel. The wire of the first rotation axle is inserted through a guide hole and a groove of the drive wheel and then out of a nozzle. The drive wheel has a non-slip portion to prevent the slack of the wire.

However, although the above-mentioned wire feeding devices can achieve the effect of preventing the wire from slipping and precisely conveying the wire during the conveyance, they cannot be directly installed to a nozzle. Furthermore, the length of a conveying tube cannot be adjusted according to the demand of working. It is inconvenient for assembly and use. Besides, the wire feeding device doesn't provide a protective gas. Therefore, when the wire is used for metal printing or welding, it is easy to cause the molten metal to be oxidized by the influence of oxygen.

In addition, Taiwan Patent Publication No. 1225435 discloses a "welding wire feeding device". A metal wire feeding path is formed between a wire accommodating container and a welding torch. The path is provided with a plurality of metal wire feeding units. One of the metal wire feeding units is provided with a drive source to generate a drive force for driving the metal wire feeding units. The drive force is transmitted to the welding wire by a torque limit device. The metal wire no matter in an acceleration or deceleration state can maintain a stable feeding and avoid bending of the metal wire. A gas cylinder is used to spray an inert gas toward the molten body was so as to shield and protect the welding part. However, the above-mentioned wire feeding device cannot be directly installed to a nozzle and cannot adjust the length of a conveying tube according the demand of working. It is still inconvenient for assembly and use.

Accordingly, the inventor of the present invention has devoted himself based on his many years of practical experiences to solve these problems.

SUMMARY OF THE INVENTION

In view of the problem that the conventional wire feeding device cannot directly connect a nozzle and cannot adjust the length of a conveying tube and is unable to provide a protective gas, it is necessary to improve the feeding device.

The primary object of the present invention is to provide a welding wire feeding device. Through a fixing seat, a conveying mechanism is directly locked to a base, so that a conveying tube of the conveying mechanism can be pushed by pressing a press member. The feeding device is easy to be coupled to a working machine for various fields. The length of the conveying tube can be adjusted according to the working demand.

Another object of the present invention is that a tubular member of the conveying mechanism is formed with an air hole and the base is formed with a passage for supplying a gas. The passage is connected with a gas cylinder, so that an inert gas can be outputted from the air hole to prevent a workpiece from being oxidized due to exposure to oxygen.

In order to achieve the aforesaid object, the welding wire feeding device of the present invention comprises a base, a fixing post, a pressing member, a tension spring, a motor, a driving wheel, a conveying mechanism, a side cover, and a fixing seat. The base is formed with an accommodation trough. One end of the base has a first passage and a second passage. The fixing post is locked to the base. One end of the pressing member is provided with a fixed portion pivotally connected to the base. Another end of the pressing member is pivotally connected with a driven wheel. The driven wheel is located in the accommodation trough of the base. The tension spring is connected between the fixing post and the pressing member. The motor is mounted to the base and formed with a shaft portion. The driving wheel is disposed on the base and pivotally connected with the shaft portion of the motor. The driving wheel is located at a position in contact with the driven wheel. The conveying mechanism comprises a tubular member, a connector, a collet chuck, a metal ring, a press member, an elastic member, a cover head, and a conveying tube. The tubular member is formed with a hollow tubular body and mounted to the base. One end of the tubular member is provided with a stud. The tubular member has a through hole therein corresponding to the first passage and at least one penetrating air hole in the vicinity of the through hole. The connector has a through hole and is fitted on the stud of the tubular member. The collet chuck is disposed between the connector and the tubular member. The collet chuck has a through hole. A clamping end of the collet chuck is formed with a plurality of notches. The metal ring is fitted on the collet chuck and held between the stud and the clamping end. The press member has a through hole and is inserted into the tubular member. The elastic member is disposed between the press member and the tubular member. A cover head is fitted on the tubular member and has an outlet. The conveying tube is inserted through the through hole of the tubular member, the through hole of the connector, and the outlet of the cover head in sequence and clamped by the clamping end of the collet chuck. The side cover is locked to the base. The fixing seat is locked to the base and the side cover, so that the conveying mechanism is coupled to the base.

According to the above, the conveying mechanism can loosen the clamping end which clamps the conveying tube by pressing the press member, and the conveying tube is pushed a specific distance. When the press member is released, the clamping end clamps the conveying tube again to complete the adjustment of the length of the conveying tube. Through the side cover and the fixing seat locked to the base in sequence, the conveying mechanism after adjustment is fixed to the base. A wire is inserted between the driving wheel and the driven wheel. At this time, the pressing member subjected to the pulling force of the tension spring enables the wire to be clamped between the driving wheel and the driven wheel and pass through the first passage and the conveying tube. The motor drives the driving wheel to rotate the driven wheel so as to stably convey the wire for processing. The inert gas can be outputted through the second passage of the base to the air hole and out from the outlet of the cover head to prevent the molten metal from being oxidized by the influence of oxygen when a workpiece is processed.

DESCRIPTION OF THE PREFERRED EMBODIMENTS

Embodiments of the present invention will now be described, by way of example only, with reference to the accompanying drawings.

Figure 1:
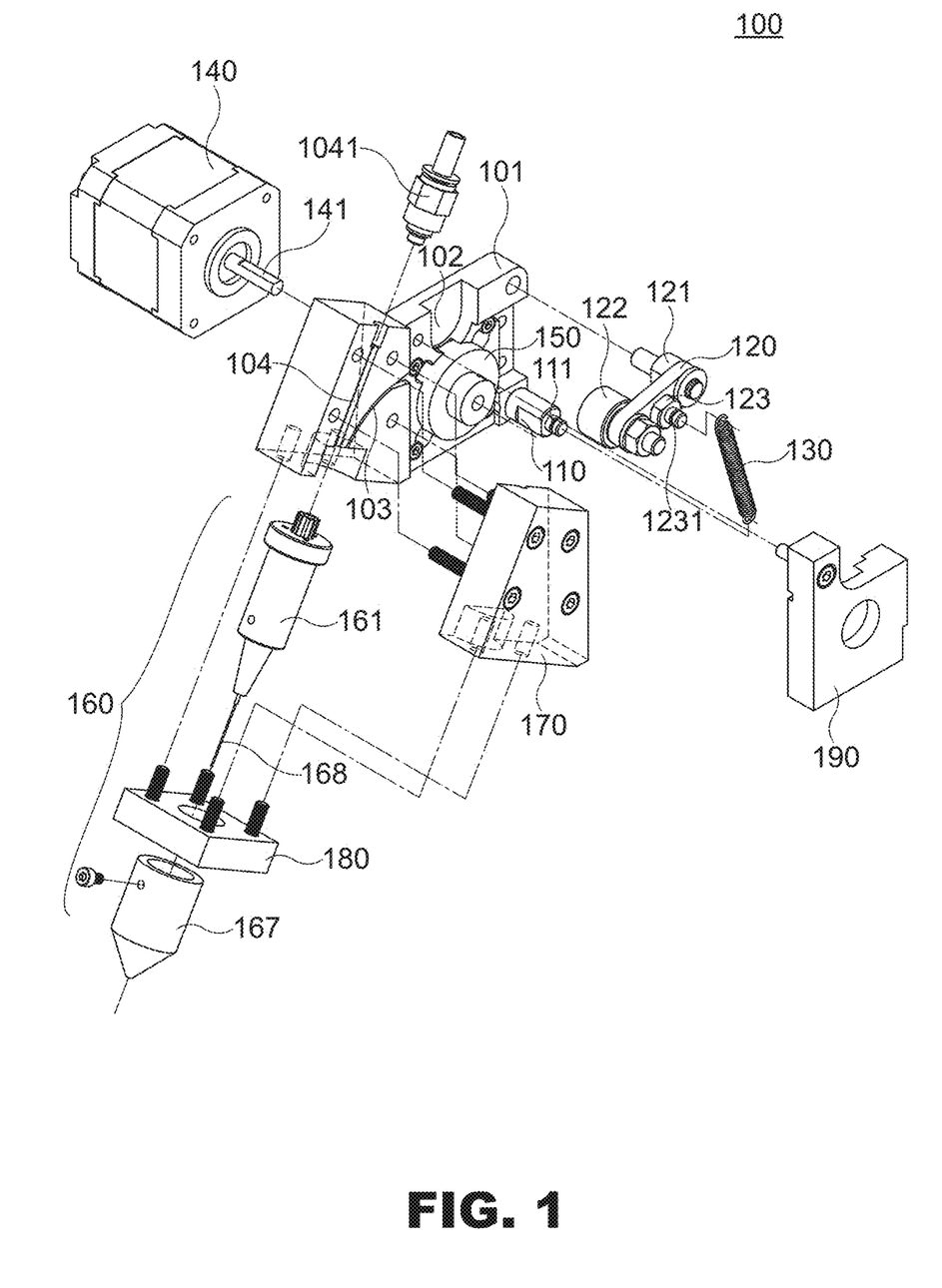
FIG. 1 is an exploded view of the present invention.
Figure 2:
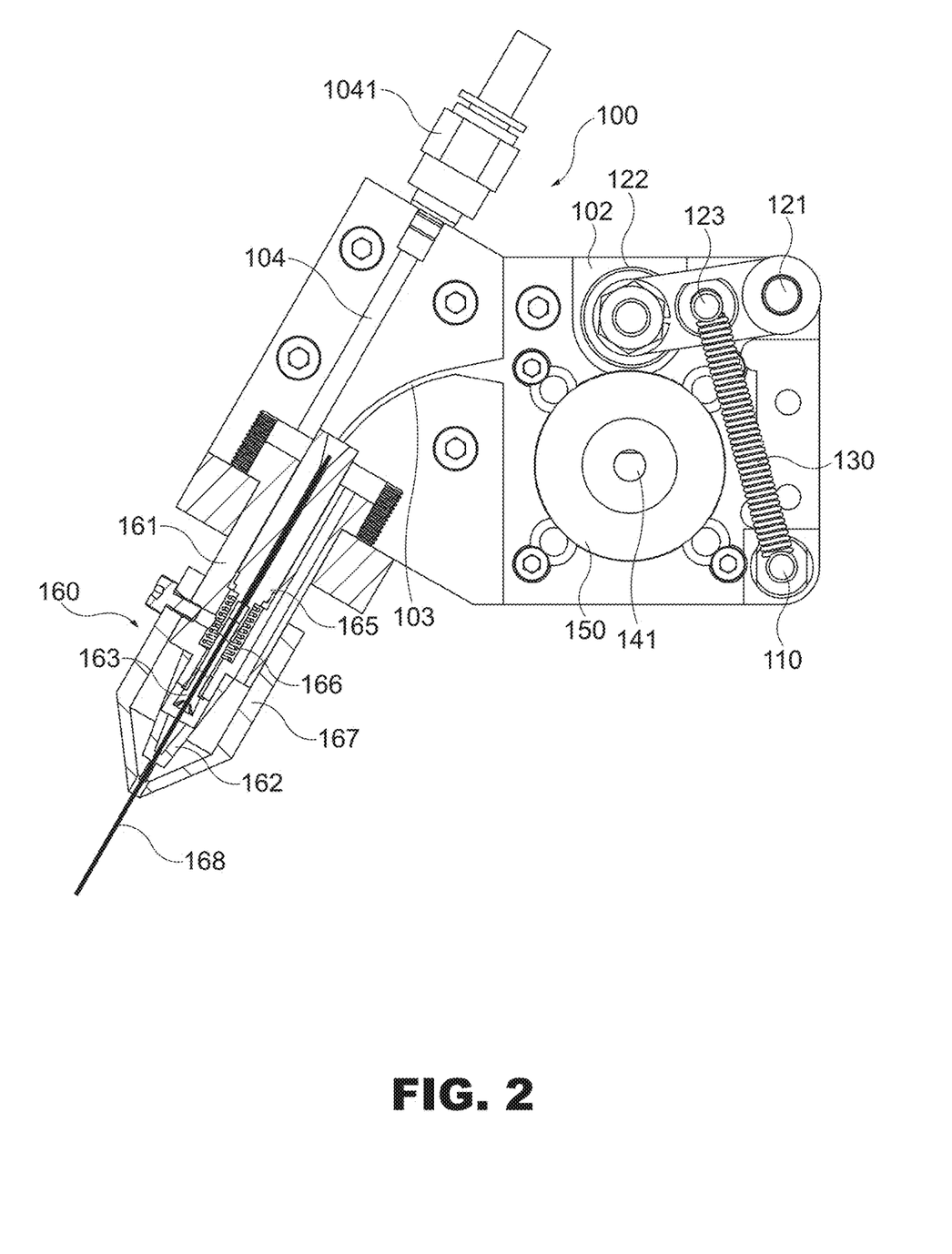
FIG. 2 is a partial sectional view of the present invention.

As shown in FIG. 1 and FIG. 2, the present invention discloses a feeding device 100. The feeding device 100 includes a base 101, a fixing post 110, a pressing member 120, a tension spring 130, a motor 140, a driving wheel 150, a conveying mechanism 160, a side cover 170, a fixing seat 180, and a protective cover 190. The base 101 is formed with an accommodation trough 102. One end of the base 101 has a first passage 103 and a second passage 104. Preferably, the second passage 104 is provided with a quick connector 1041 for connecting a gas cylinder. The fixing post 110 is locked to the base 101. The fixing post 110 is provided with a first groove 111. One end of the pressing member 120 is provided with a fixed portion 121. The fixed portion 121 is pivotally connected to the base 101. Another end of the pressing member 120 is pivotally connected with a driven wheel 122. The driven wheel 122 is located in the accommodation trough 102 of the base 101. A pillar 123 is provided between the fixed portion 121 and the driven wheels 122. The pillar 123 is provided with a second groove 1231. Two ends of the tension spring 130 are engaged with the first groove 111 of the fixing post 110 and the second groove 1231 of the pressing member 120. The motor 140 is mounted to the base 101 and formed with a shaft portion 141. The driving wheel 150 is disposed on the base 101 and pivotally connected with the shaft portion 141 of the motor 140. The driving wheel 150 is located at a position in contact with the driven wheel 122.

Figure 3:
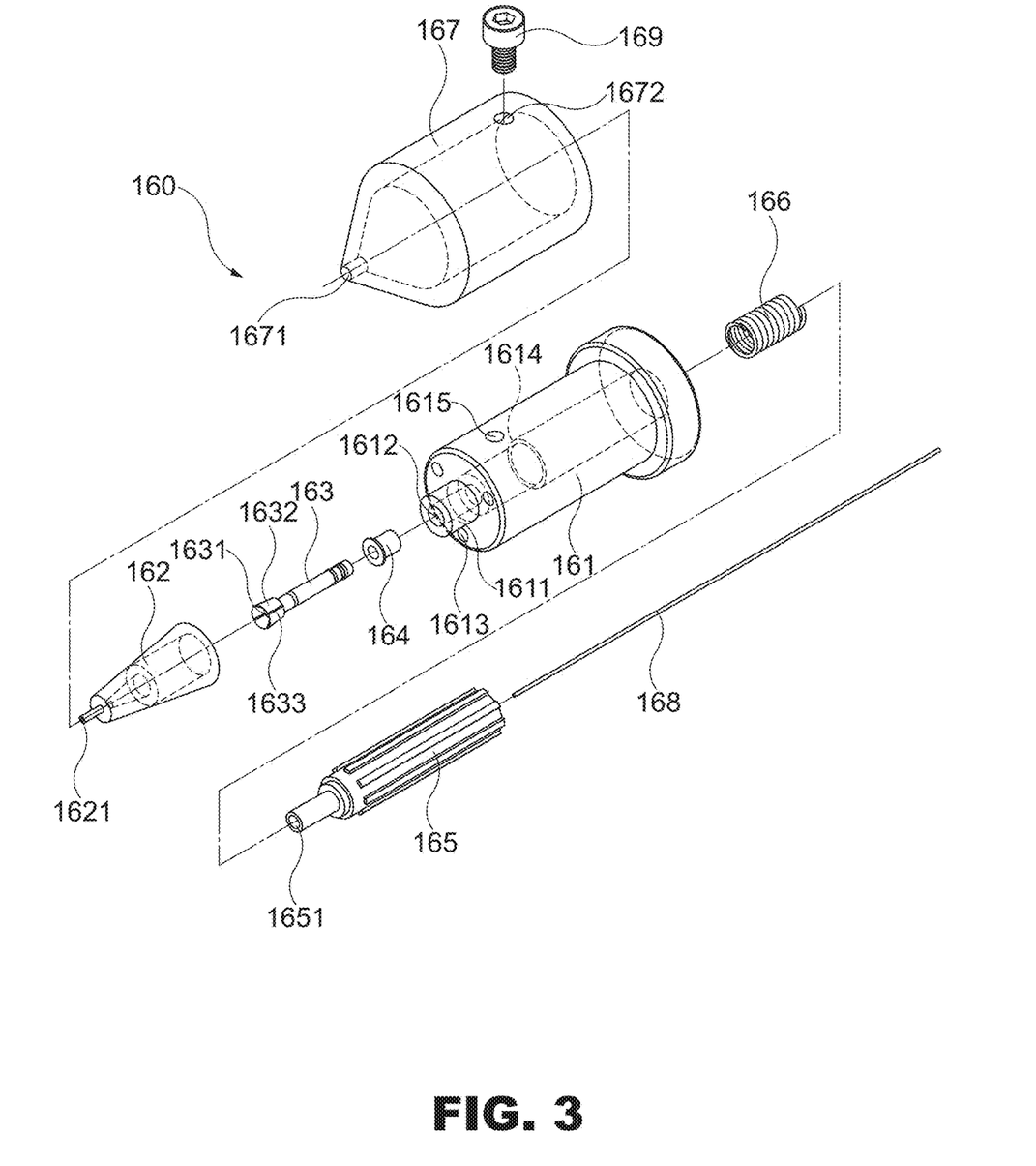
FIG. 3 is an exploded view of the conveying mechanism of the present invention.

The conveying mechanism 160 includes a tubular member 161, a connector 162, a collet chuck 163, a metal ring 164, a press member 165, an elastic member 166, a cover head 167, and a conveying tube 168 (referring to FIG. 3). The tubular member 160 is formed with a hollow tubular body and mounted to the base 101. One end of the tubular member 161 is provided with a stud 1611. The tubular member 161 has a through hole 1612 therein corresponding to the first passage 103 and at least one penetrating air hole 1613 in the vicinity of the through hole 1612. The interior of the tubular member 161 is formed with an engaging wall 1614. The connector 162 has a through hole 1621, and is fitted on the stud 1611 of the tubular member 161. The collet chuck 163 is disposed between the connector 162 and the tubular member 161. The collet chuck 163 has a through hole 1631. A clamping end 1632 of the collet chuck 163 is formed with a plurality of notches 1633. The metal ring 164 is fitted on the collet chuck 163 and held between the stud 1611 of the tubular member 161 and the clamping end 1632 of the collet chuck 163. The press member 165 has a through hole 1651, and is inserted into the tubular member 161. The elastic member 166 is disposed between the press member 165 and the tubular member 161. Preferably, the elastic member 166 is a spring. The cover head 167 is fitted on the tubular member 161 and has an outlet 1671. Preferably, the tubular member 161 and the cover head 167 have corresponding screw holes 1615, 1672, respectively. A screw 169 is inserted into the screw hole 1672 of the cover head 167 and the screw hole 1615 of the tubular member 161. The conveying tube 168 is inserted through the through hole 1612 of the tubular member 161, the through hole 1621 of the connector 162, and the outlet 1671 of the cover head 167 in sequence, and is clamped by the clamping end 1632 of the collet chuck 163. Preferably, the conveying tube 168 is capable of conveying a wire of 0.5 mm or less. The side cover 170 is locked to the base 101. The conveying mechanism 160 is sandwiched between the base 101 and the side cover 170. The fixing seat 180 is locked to the base 101 and the side cover 170, so that the conveying mechanism 160 is coupled to the base 101. The protective cover 190 is locked to the base 101 to cover the driving wheel 150 so as to avoid dust.

Figure 4:
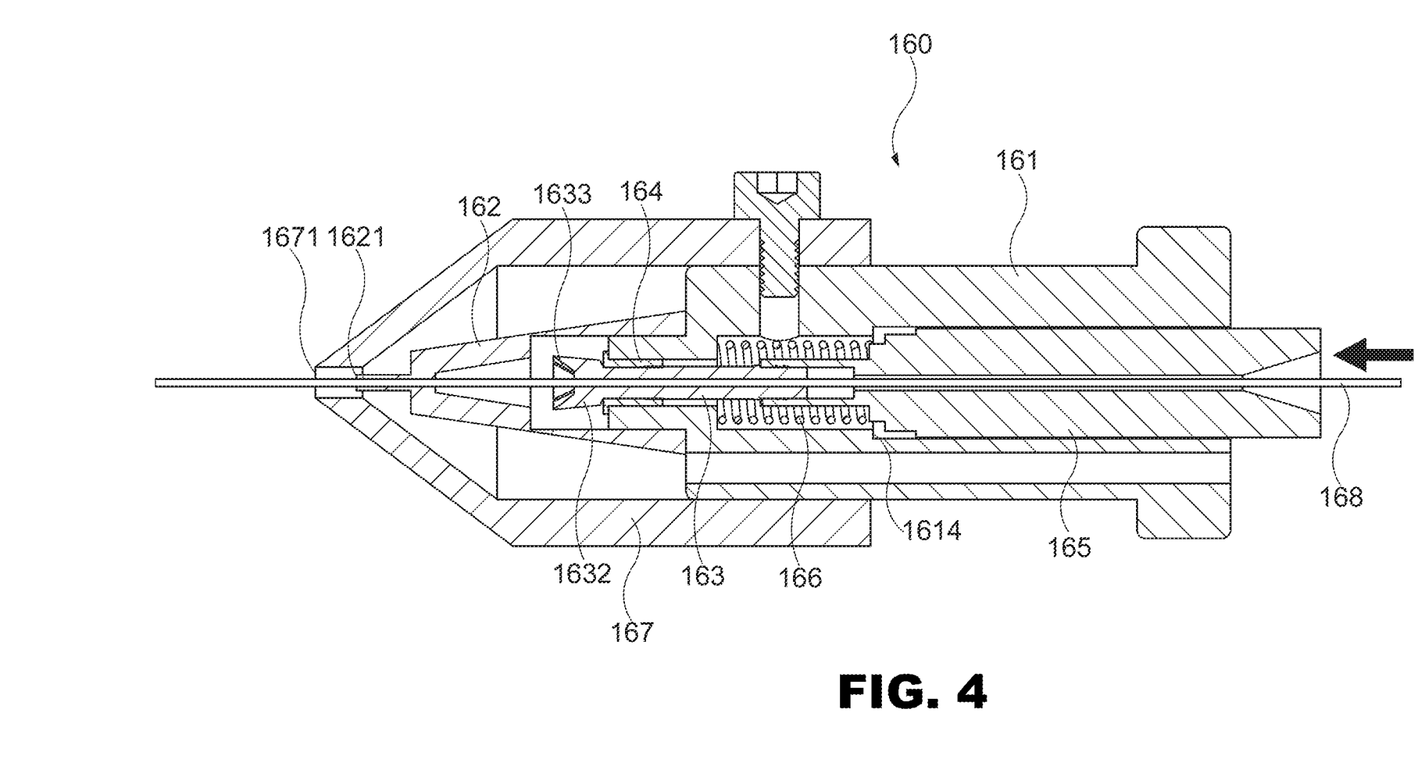
FIG. 4 and FIG. 5 are schematic views showing an adjustment of the conveying tube of the present invention.
Figure 5:
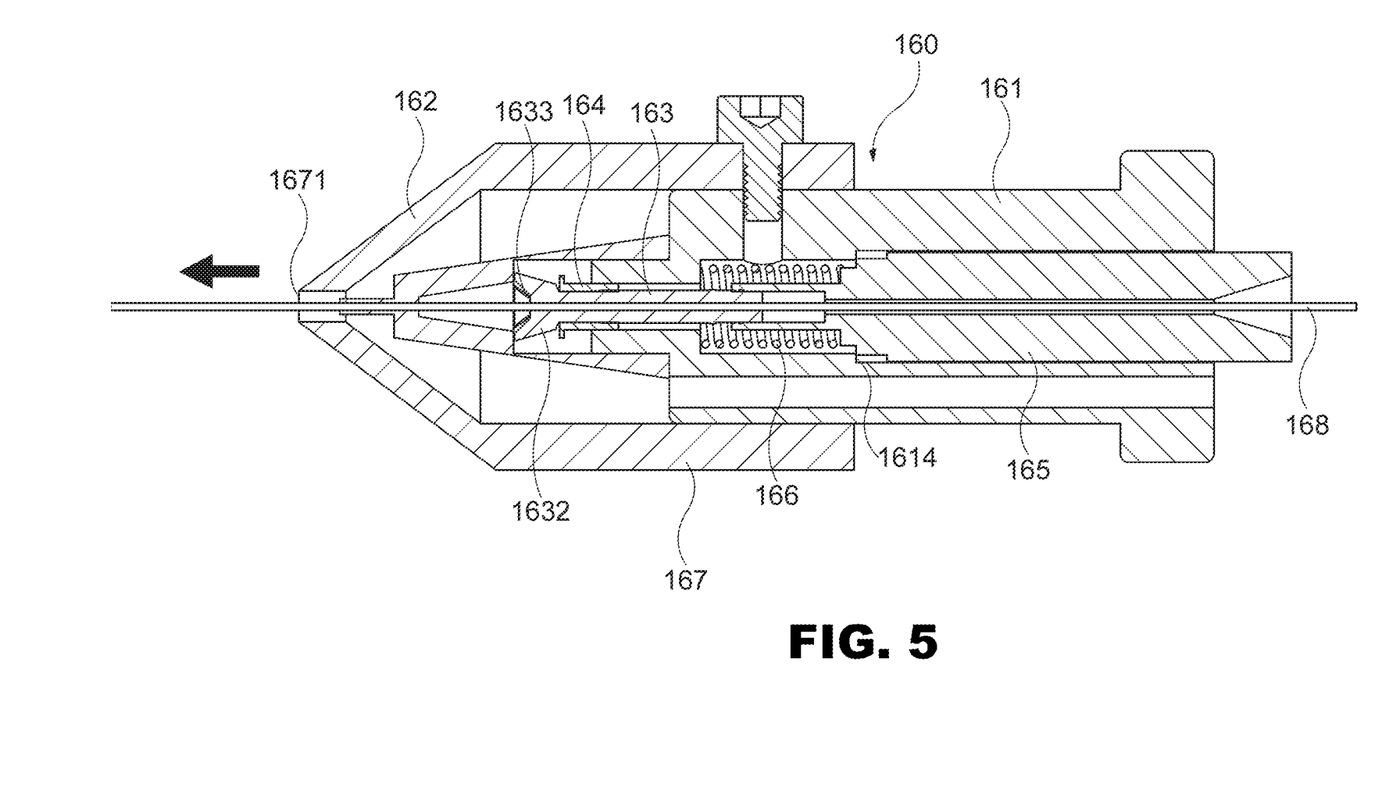

FIG. 4 is a schematic view of the conveying tube of the present invention. When the conveying tube 168 is inserted through the press member 165, the collet chuck 163 and the through hole 1621 of the connector 162 and out of the outlet 1671 of the cover head 167, the press member 165 is engaged with the engaging wall 1614 of the tubular member 161. The collet chuck 163 is pushed, so that the clamping end 1632 is held between the connector 162 and the metal ring 164 (as denoted by the arrow in FIG. 4). At this time, the clamping end 1632 of the collet chuck 163 is expanded outwardly along the notches 1633 (referring to FIG. 5) by pressing. The conveying tube 168 is pushed a specific distance toward the outlet 1671 (as denoted by the arrow in FIG. 5). When the press member 165 is released, the collet chuck 163 is returned to its original position by the elastic restoring force of the elastic member 166 and the clamping end 1632 is restored to clamp the conveying tube 168. The conveying tube 168 can be adjusted to a desired length by pressing the press member 165 repeatedly.

Figure 6:
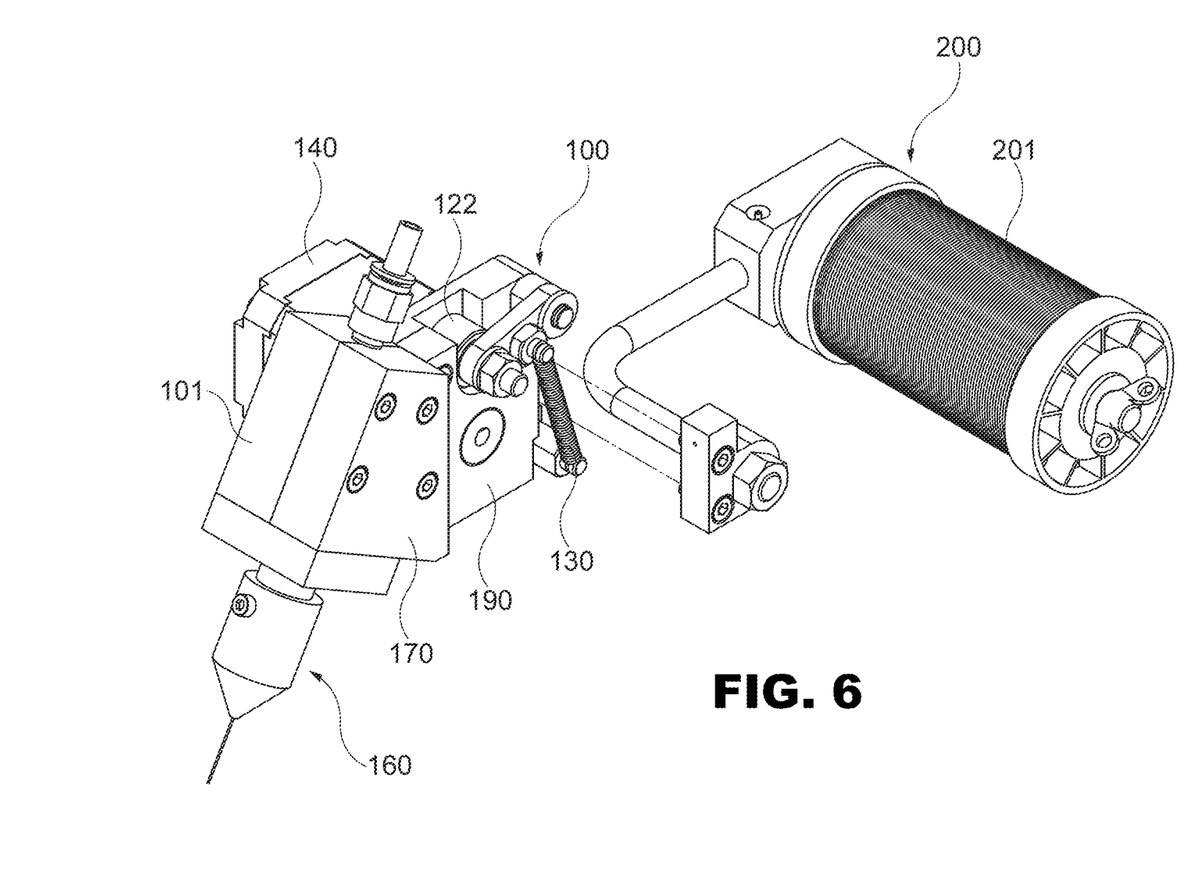
FIG. 6 is a perspective view of the present invention.

When the adjustment of the conveying mechanism 160 is completed, the tubular member 161 is sandwiched between the base 101 and the side cover 170 (reviewing FIG. 1). The fixing seat 180 is locked to the base 101 and the side cover 170, so that the conveying mechanism 160 is fixed to the base 101. In an embodiment of the present invention, the feeding device 100 further comprises a wire supply mechanism 200. FIG. 6 is a perspective view of the present invention. The base 101 is connected with the wire supply mechanism 200. The wire supply mechanism 200 directly supplies a metal wire 201 to the feeding device 100 to increase the stability of the feeding of the metal wire 201.

Figure 7:
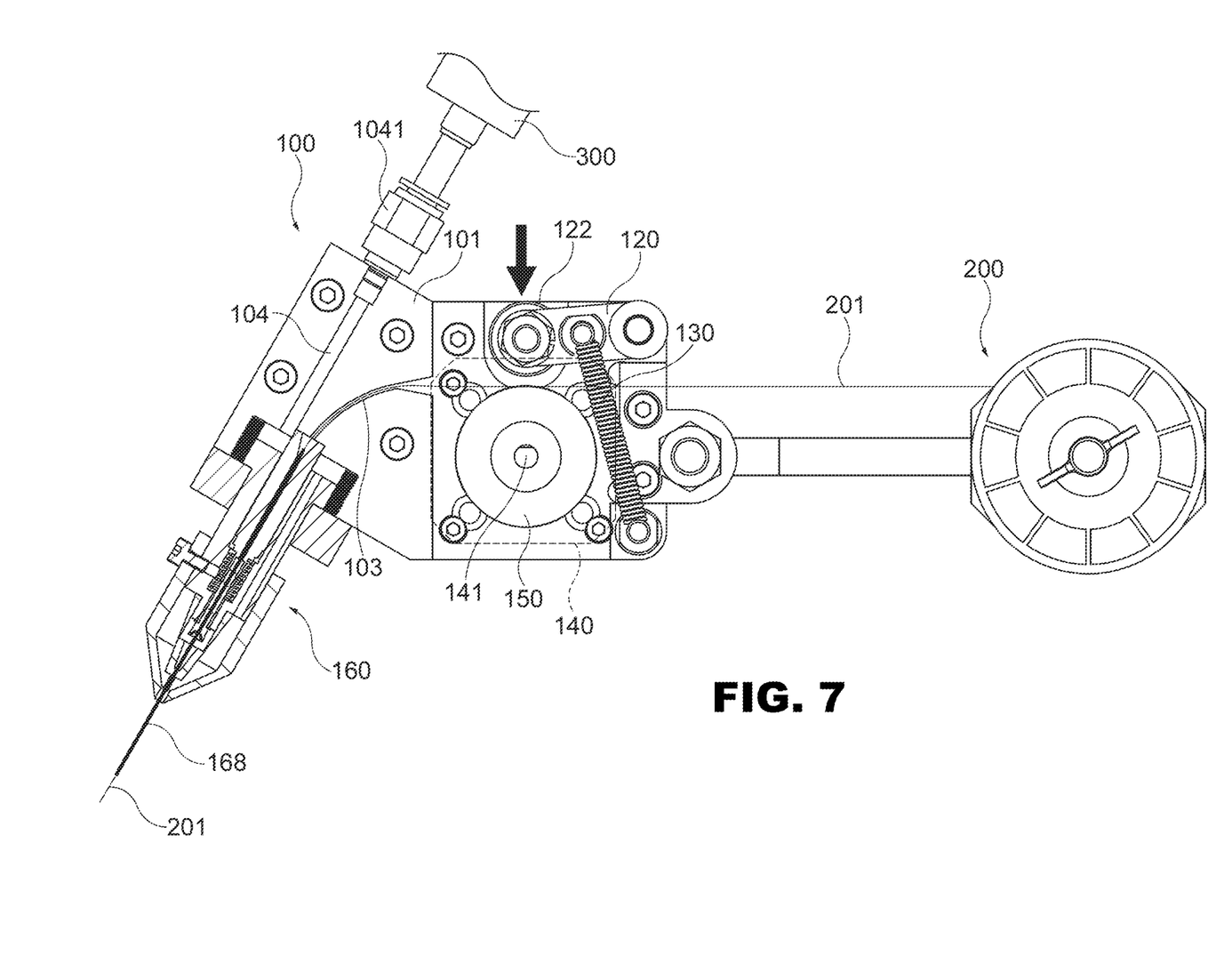
FIG. 7 and FIG. 8 are schematic views of the present invention when in use.
Figure 8:
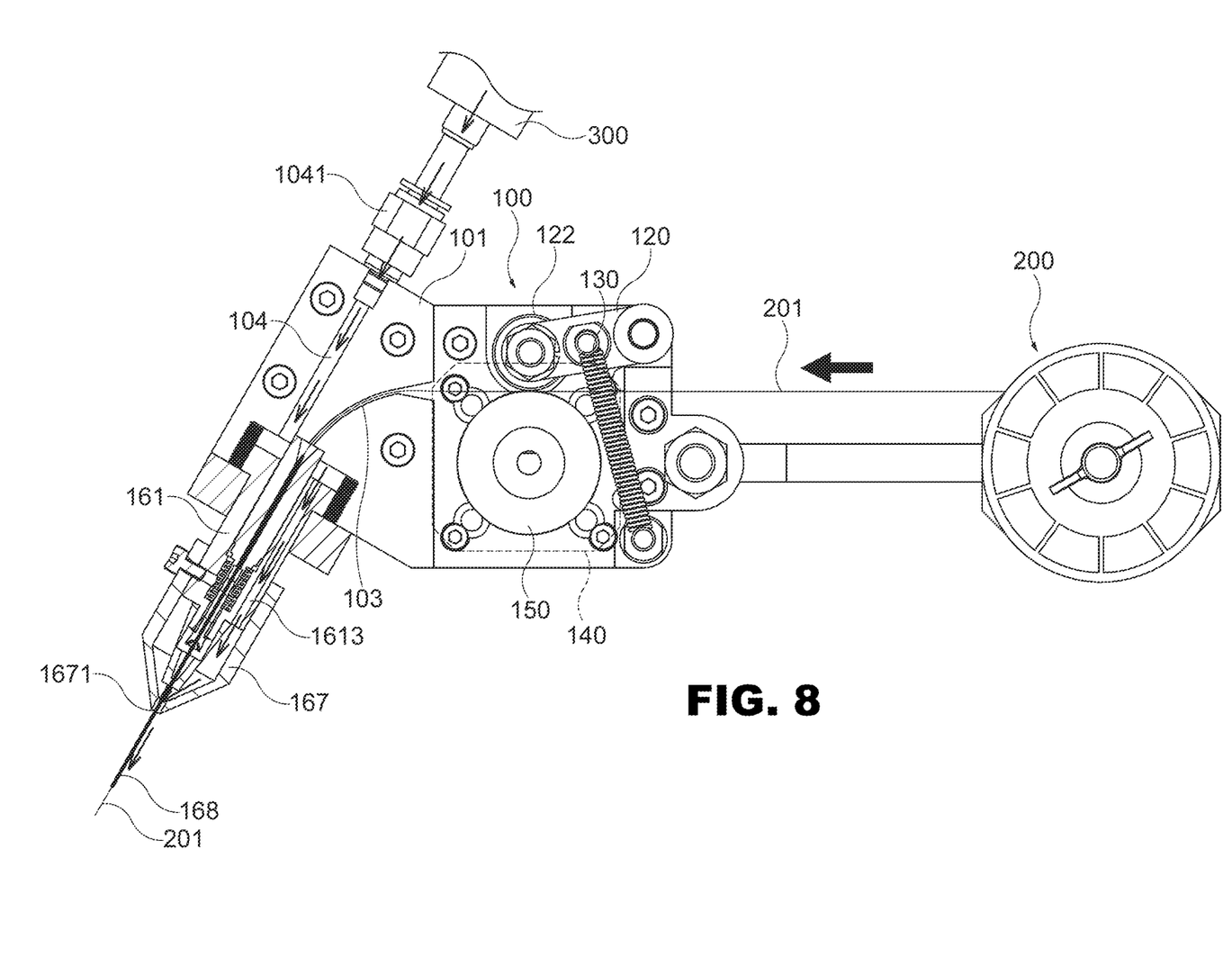

FIG. 7 is a schematic view of the present invention when in use. After the metal wire 201 is pulled out of the wire supply mechanism 200, it is inserted between the driving wheel 150 and the driven wheel 122. The driven wheel 122 is biased by the tension spring 130 of the pressing member 120, so that the metal wire 201 is clamped between the driven wheel 122 and the driving wheel 150 (as denoted by the arrow in FIG. 7), and then the metal wire 201 is pulled into the first passage 103 of the base 101 and pulled out by the conveying tube 168 of the conveying mechanism 160 to complete the installation of the metal wire 201. The gas cylinder 300 filled with an inert gas (such as argon, argon combined with carbon dioxide, carbon dioxide, nitrogen, etc.) is connected to the quick connector 1041. Thereby, the shaft portion 141 of the motor 140 drives the driving wheel 150 to rotate, and the driven wheel 122 is driven by the driving wheel 150 to rotate simultaneously. The metal wire 201 located between the driving wheel 150 and the driven wheel 122 is conveyed to the conveying tube 168 for subsequent processing, referring to FIG. 8. When the metal wire 201 is conveyed, the gas cylinder 300 coupled to the quick connector 1041 can output the inert gas through the second passage 104 of the base 101 to the air hole 1613 of the tubular member 161 and then the inert gas is sent out from the outlet 1671 of the cover head 167. When the metal wire 201 is used for processing a workpiece, it is possible to prevent the molten metal from being oxidized due to the influence of oxygen during the processing by the shielding of the inert gas. It is to be noted that the air hole 1613 of the tubular member 161 is parallel to the conveying tube 168, so that the metal wire 201 does not swing and sway due to the flow of the inert gas introduced into the air hole 161. When the metal wire 201 is melted, the inert gas can provide a better protection for the metal wire 201.

Therefore, the feeding device of the present invention is clearly able to achieve the following effects:

1. In the feeding device of the present invention, the metal wire is clamped between the driven wheel and the driving wheel through the tension spring of the pressing member, so that the metal wire won't loosen easily during conveyance to provide a stable conveyance. The rotational speed of the motor can be controlled to adjust the conveying speed of the metal wire. In addition, the conveying tube is able to convey a fine wine of 0.5 mm or less to improve the repair precision.

2. The pressing device of the feeding device of the present invention can be opened with the fixed portion as an axis for the user to insert or replace the metal wire and to maintain the driving wheel and the driven wheel, thereby improving the use of the feeding device.

3. The second passage of the feeding device of the present invention is connected with the gas cylinder filled with an inert gas. The gas cylinder outputs the inert gas to the air hole of the tubular member and out from the outlet of the cover head while the metal wire is conveyed. The air hole of the tubular member is parallel to the conveying tube, so that the metal wire does not swing and sway due to the flow of the inert gas introduced into the air hole. When a workpiece is processed, it is able to avoid an oxidation phenomenon when the molten metal or the metal wire is melted.

4. The feeding device of the present invention has a simple structure and is small in size. The wire supply mechanism can be coupled to the base, so that the metal wire required for the feeding device can be directly supplied by the wire supply mechanism to increase the stability of conveying the metal wire. The feeding device is not only convenient for conveyance and assembly but also easy to be coupled to a working machine for various fields. It is very practical.

5. The conveying mechanism of the present invention can push the conveying tube to a specific distance by pressing the press member, so that the length of the conveying tube can be easily adjusted and the conveying tube can be clamped and fixed by the clamping end. The feeding device can be adapted to different job requirements.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A welding wire feeding device, comprising:
    a base, the base being formed with an accommodation trough, one end of the base having a first passage and a second passage;
    a fixing post, locked to the base;
    a pressing member, one end of the pressing member being provided with a fixed portion pivotally connected to the base, another end of the pressing member being pivotally connected with a driven wheel, the driven wheel being located in the accommodation trough of the base;
    a tension spring, the tension spring being connected between the fixing post and the pressing member;
    a motor, mounted to the base and formed with a shaft portion;
    a driving wheel, disposed on the base and pivotally connected with the shaft portion of the motor, the driving wheel being located at a position in contact with the driven wheel;
    a conveying mechanism, comprising:
        a tubular member, the tubular member being formed with a hollow tubular body and mounted to the base, one end of the tubular member being provided with a stud, the tubular member having a through hole therein corresponding to the first passage and at least one penetrating air hole in the vicinity of the through hole;

a connector, the connector having a through hole and being fitted on the stud of the tubular member;

a collet chuck, the collet chuck being disposed between the connector and the tubular member, the collet chuck having a through hole, a clamping end of the collet chuck being formed with a plurality of notches;

a metal ring, fitted on the collet chuck and held between the stud and the clamping end;

a press member, the press member having a through hole and being inserted into the tubular member;

an elastic member, the elastic member being disposed between the press member and the tubular member;

a cover head, fitted on the tubular member and having an outlet; and a conveying tube, inserted through the through hole of the tubular member, the through hole of the connector, and the outlet of the cover head in sequence and clamped by the clamping end of the collet chuck;

a side cover, locked to the base, and a fixing seat, locked to the base and the side cover so that the conveying mechanism is coupled to the base.

2. The welding wire feeding device as claimed in claim 1, further comprising a wire supply mechanism, the wire supply mechanism being locked to the base, a wire of the wire supply mechanism being inserted between the driving wheel and the driven wheel to enter the conveying tube from the first passage.

3. The welding wire feeding device as claimed in claim 1, wherein the fixing post is provided with a first groove, the pressing member is formed with a pillar, the pillar is provided with a second groove, and two ends of the tension spring are engaged with the first groove and the second groove.

4. The welding wire feeding device as claimed in claim 1, further comprising a protective cover, the protective cover being locked to the base to cover the driving wheel.

5. The welding wire feeding device as claimed in claim 1, wherein the air hole of the tubular member is parallel to the conveying tube.

6. The welding wire feeding device as claimed in claim 1, wherein the elastic member is a spring.

7. The welding wire feeding device as claimed in claim 1, wherein the second passage is provided with a quick connector for connecting a gas cylinder.

8. The welding wire feeding device as claimed in claim 1, wherein the conveying tube is capable of conveying a wire of 0.5 mm or less.

9. The welding wire feeding device as claimed in claim 1, wherein the tubular member and the cover head have corresponding screw holes respectively, and a screw is inserted into the screw hole of the cover head and locked to the screw hole of the tubular member.

* * * * *